US012308565B2

(12) United States Patent
Wu

(10) Patent No.: US 12,308,565 B2
(45) **Date of Patent: *May 20, 2025**

(54) PLUG CONNECTOR

(71) Applicants: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Guang Dong (CN)

( * ) Notice: Subject to any disclaimer, the term of this patent is extended or adjusted under 35 U.S.C. 154(b) by 314 days.

This patent is subject to a terminal disclaimer.

(21) Appl. No.: 17/994,278

(22) Filed: Nov. 26, 2022

(65) Prior Publication Data

US 2024/0178612 A1 May 30, 2024

(51) Int. Cl.
*H01R 13/627* (2006.01)
*H01R 13/635* (2006.01)

(52) U.S. Cl.
CPC ....... *H01R 13/6272* (2013.01); *H01R 13/635* (2013.01)

(58) Field of Classification Search
CPC .............. H01R 13/6272; H01R 13/635; H01R 13/6335
USPC .................................................. 439/352, 372
See application file for complete search history.

(56) References Cited

U.S. PATENT DOCUMENTS 5,174,786 A * 12/1992 Kato .................... H01R 13/641 439/352
6,146,179 A * 11/2000 Denny ............... H01R 13/6335 439/352
6,254,418 B1 * 7/2001 Tharp ................ H01R 13/6335 439/352
6,953,356 B2 * 10/2005 Hisamatsu ......... H01R 13/6273 439/258

(Continued)

*Primary Examiner* — Gary F Paumen
(74) *Attorney, Agent, or Firm* — Chun-Ming Shih; LANWAY IPR SERVICES

(57) ABSTRACT

A plug connector (1) includes: an insulation housing (10) having a main body part (11) and multiple columnar plugging members (15); multiple electric conductive terminals (20) disposed in the insulation housing (10) corresponding the hollow columnar plugging members (15); and an unlocking assembly (30) having a locking part (31) and an actuating part (32) separately arranged relative to the locking part (31), the actuating part (32) is disposed corresponding to the locking part (31), the locking part (31) has a pivotal part (311), a locking piece (312) and a force applying arm (313), a latching hook (3121) is formed on one end of locking piece (312) away from the pivotal part (311); an external force is applied to the actuating part (32) to drive the locking part (31) to rotate to make the latching hook (3121) and a socket connector (8) be unbuckled.

10 Claims, 14 Drawing Sheets

(56) References Cited

U.S. PATENT DOCUMENTS

| | | | | |
|---|---|---|---|---|
| 8,783,968 | B2 * | 7/2014 | Adams | G02B 6/3893 439/352 |
| 2005/0075001 | A1 * | 4/2005 | Shearman | H01R 43/26 439/352 |
| 2008/0311781 | A1 * | 12/2008 | Wojcik | H01R 13/506 439/352 |
| 2011/0111617 | A1 * | 5/2011 | Handshaw | H01R 43/26 439/352 |
| 2016/0322750 | A1 * | 11/2016 | Plamondon | H01R 13/6272 |

* cited by examiner

PLUG CONNECTOR

BACKGROUND OF THE DISCLOSURE

Technical Field

The present disclosure relates to an electric connector, especially to a plug connector.

Description of Related Art

A related-art electric connector is used for connecting a power source and a device, connecting a device and a device or connecting internal units of a device to establish an electric connecting structure. The electric connector may be consisted of a plug connector and a socket connector being electrically connected. The socket connector and the plug connector are electrically connected through socket terminals and plug terminals, and the socket terminals and the plug terminals are respectively disposed and fastened on a housing and a chip.

The related-art plug connector mainly has an insulation housing, a plurality of electric conductive terminals and a locking mechanism. The electric conductive terminals are disposed in the insulation housing, the locking mechanism is formed on the insulation housing to make a socket connector be mutually locked or unlocked.

However, there are some problems when the plug connector is in actual operations. Because the locking mechanism and the insulation housing are formed in one piece, and the locking mechanism is disposed at an external space of the insulation housing, a mold used for manufacturing the above-mentioned components has to be greatly enlarged and the production cost of the mold is increased. Moreover, the locking mechanism is a single-piece component and provided with various functions such as rotating, locking, unlocking and elastically recovering, thus the manufacturing difficulty is greatly increased. During the process of the locking mechanism being operated, various poor situations, such as being not enough or over may happen when the deforming degree of the locking mechanism being rotated, thus the unlocking and unbuckling performance is lowered.

Accordingly, the applicant of the present disclosure has devoted himself for improving the mentioned shortages.

SUMMARY OF THE DISCLOSURE

The present disclosure is to provide a plug connector, in which a locking part and an actuating part are separately disposed, thus the manufacturing process is easy, the pressing operation is convenient and the unbuckling operation is simplified.

Accordingly, the present disclosure provides a plug connector, which is inserted to and combined with a socket connector, and includes an insulation housing, a plurality of electric conductive terminals and an unlocking assembly. The insulation housing has a main body part and a plurality of hollow columnar plugging members, the hollow columnar plugging members are spaced with intervals and extended from the main body part. Each of the electric conductive terminals is disposed in the insulation housing corresponding to each of the hollow columnar plugging members. The unlocking assembly is disposed on the insulation housing and has a locking part and an actuating part separately arranged relative to the locking part. The actuating part is disposed corresponding to the locking part. The locking part has a pivotal part connected to the main body part, a locking piece extended from the pivotal part and a force applying arm extended from the pivotal part towards a direction opposite to the locking piece. A latching hook is formed at one end of locking piece away from the pivotal part. An external force is applied to the actuating part, the actuating part drives the locking part to rotate to make the latching hook of the locking piece and the socket connector be unbuckled.

Advantages achieved by the present disclosure are as follows. With a recovering elastic sheet being disposed, a latching action force between the latching hook of the locking part and a locking edge of the socket connector may be increased. With longitudinal moving of the actuating part, the operation of the locking part may be more stable and accurate.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
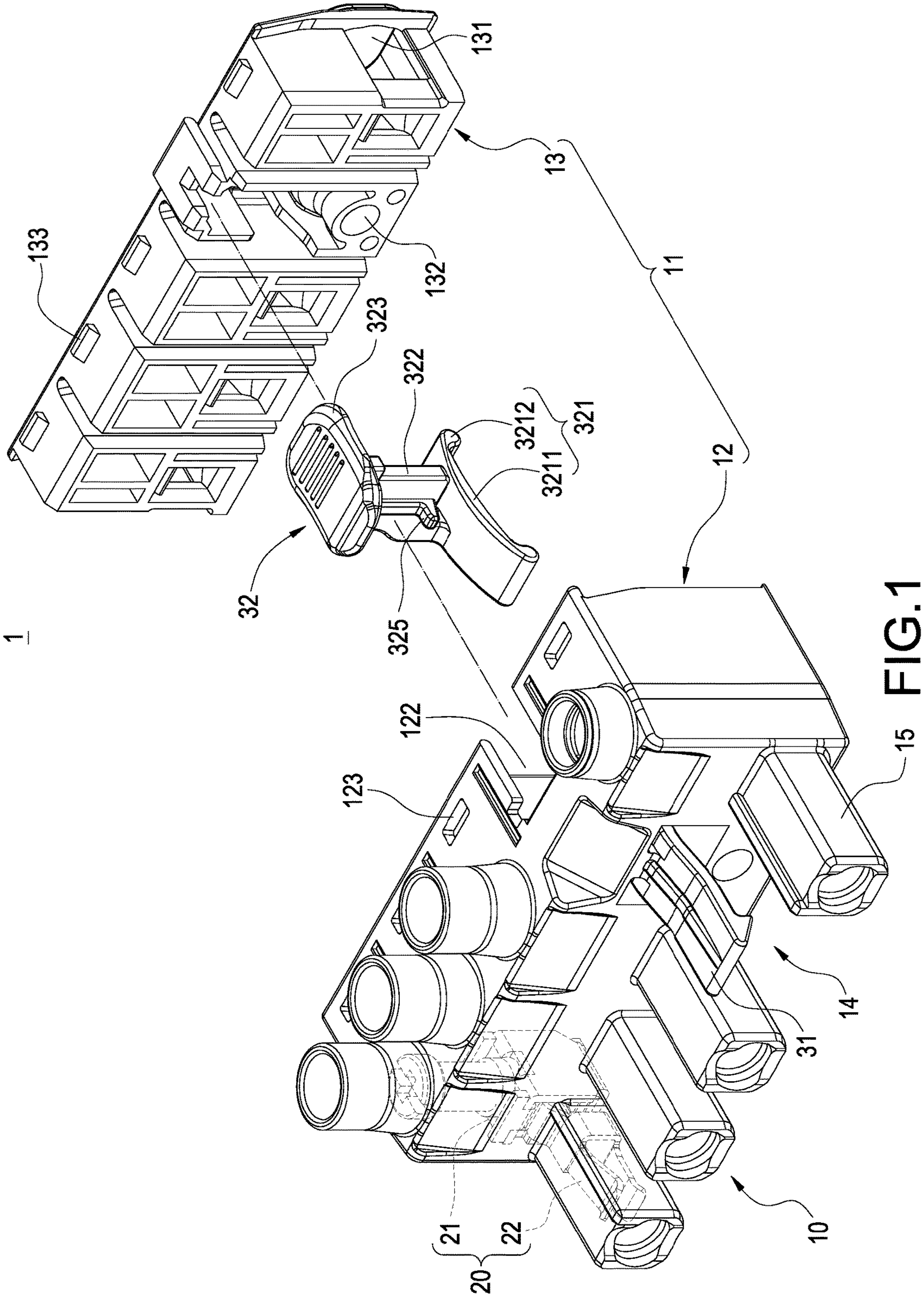
FIG. 1 is a perspective exploded view showing the plug connector according to the present disclosure.
Figure 2:
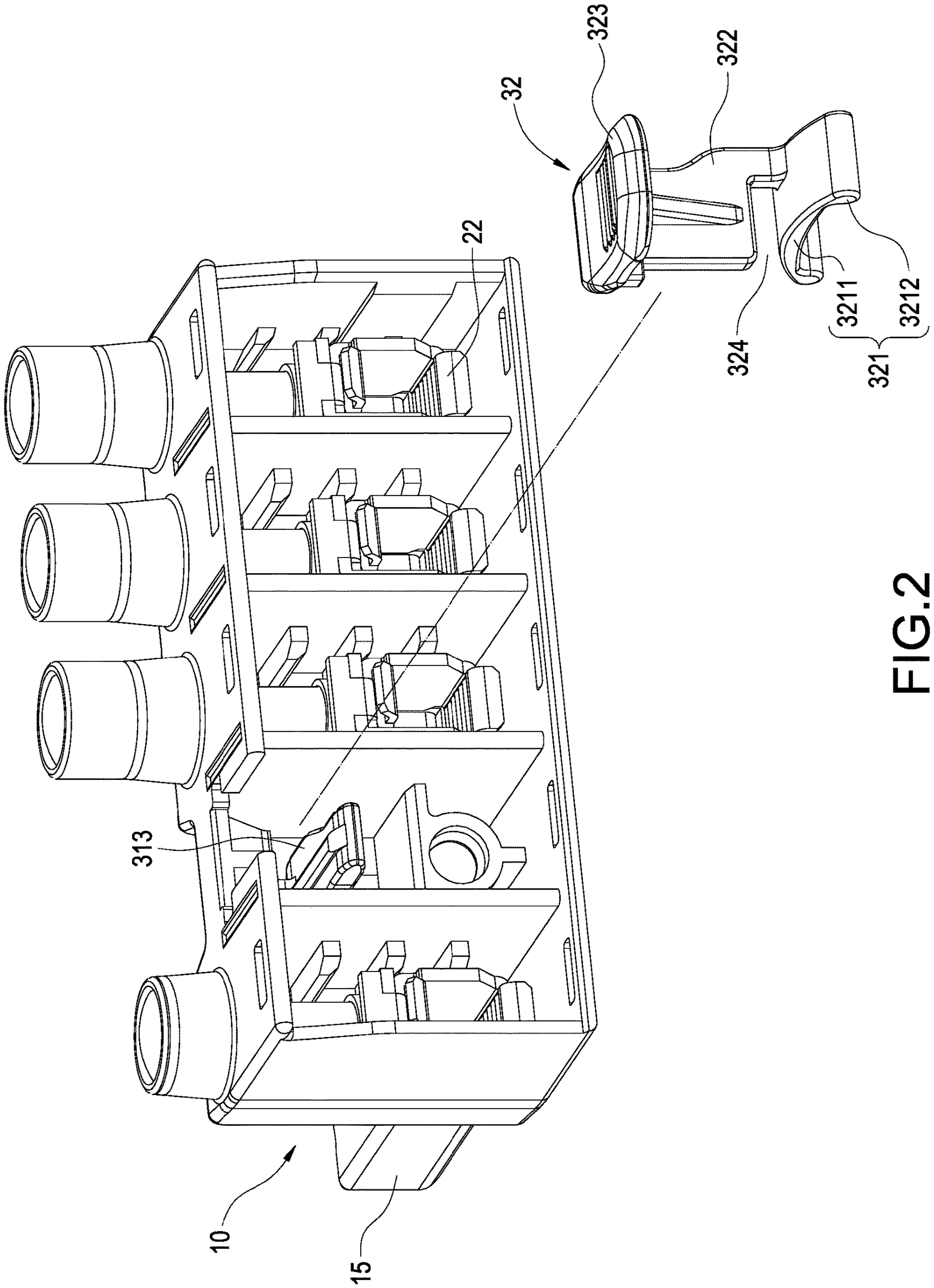
FIG. 2 is a perspective exploded view showing the front shell cap and the actuating part according to the present disclosure.
Figure 3:
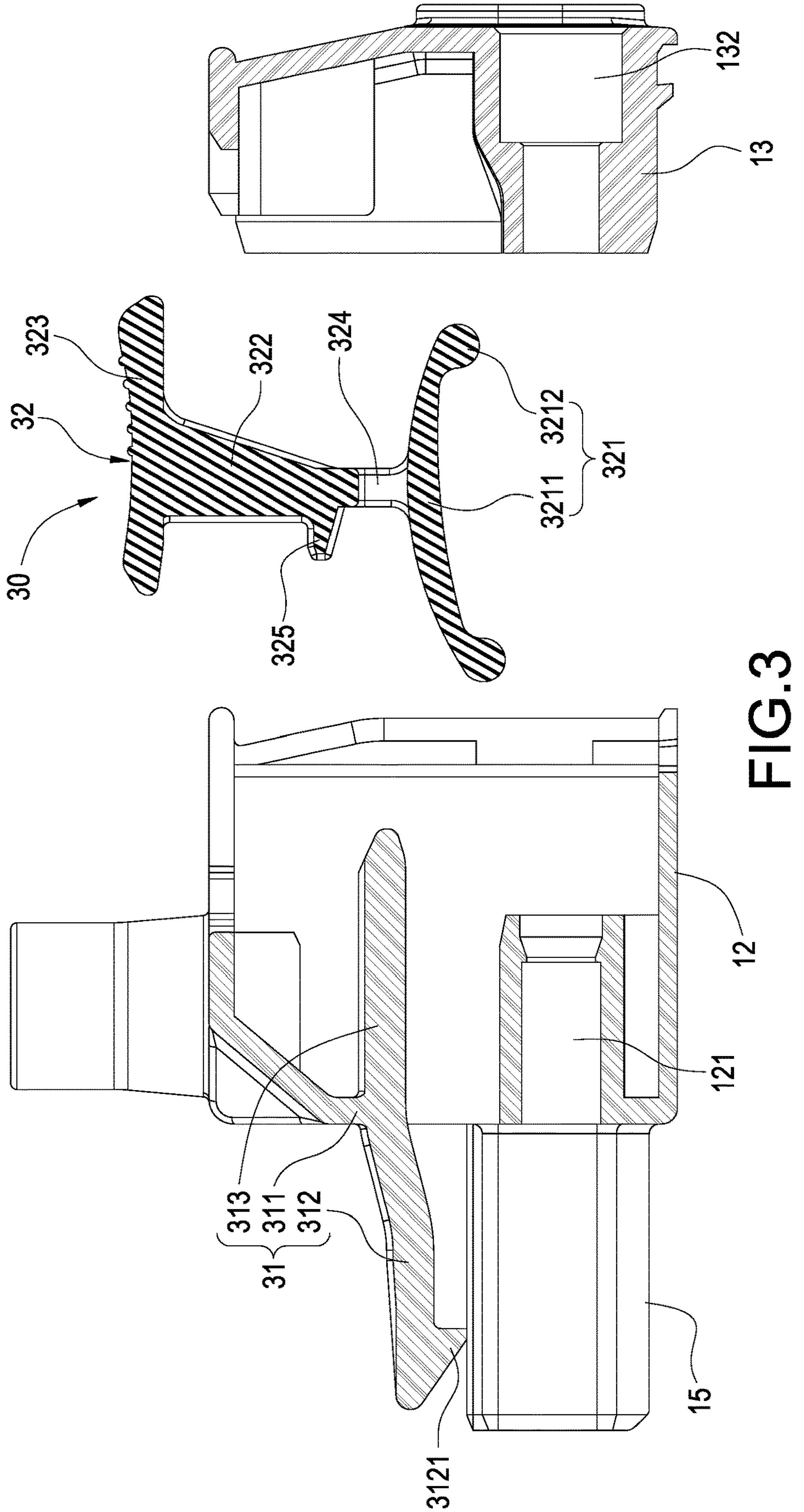
FIG. 3 is a cross sectional exploded view showing the plug connector according to the present disclosure.
Figure 4:
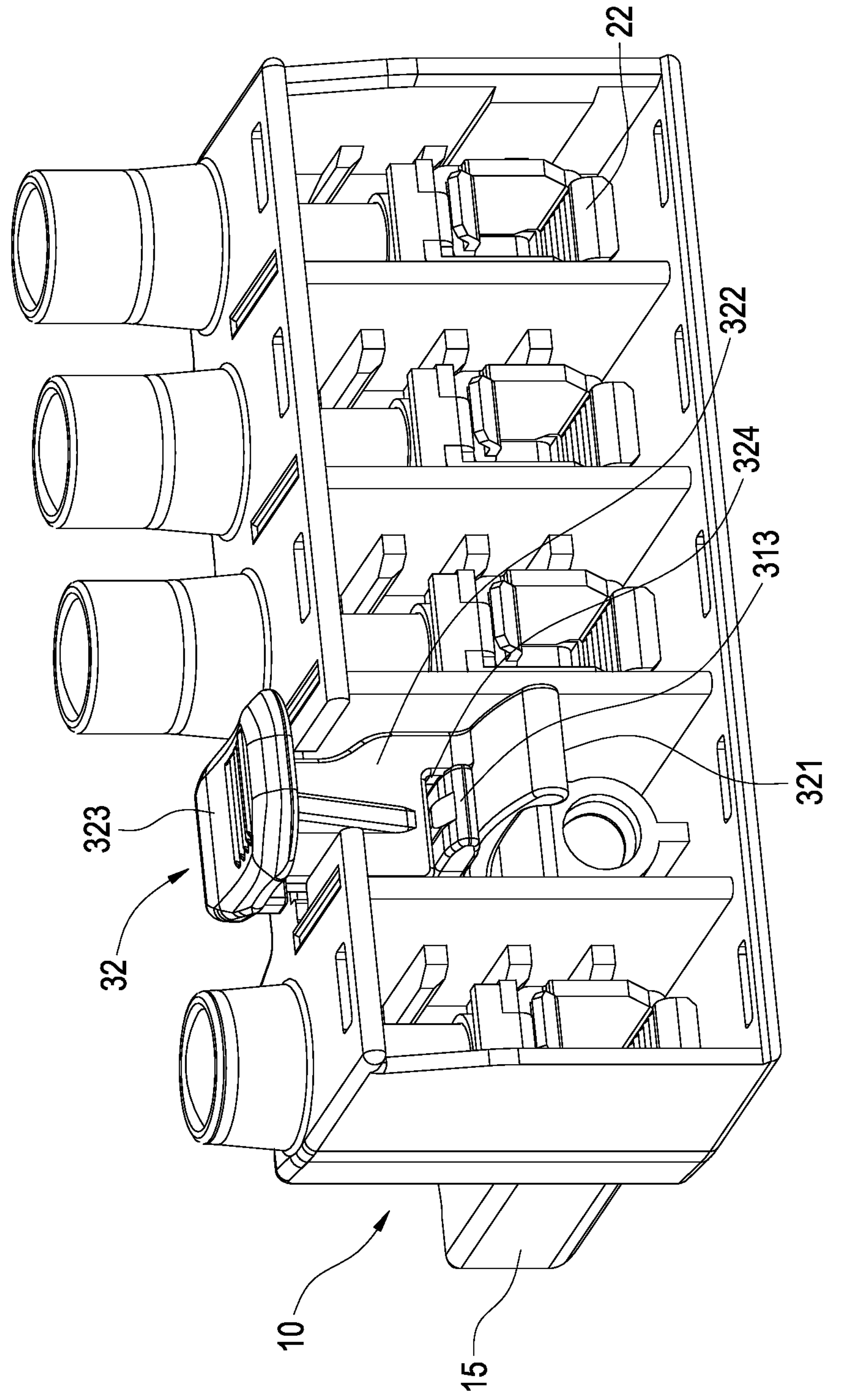
FIG. 4 is a perspective view showing the assembly of the front shell cap and the actuating part according to the present disclosure.
Figure 5:
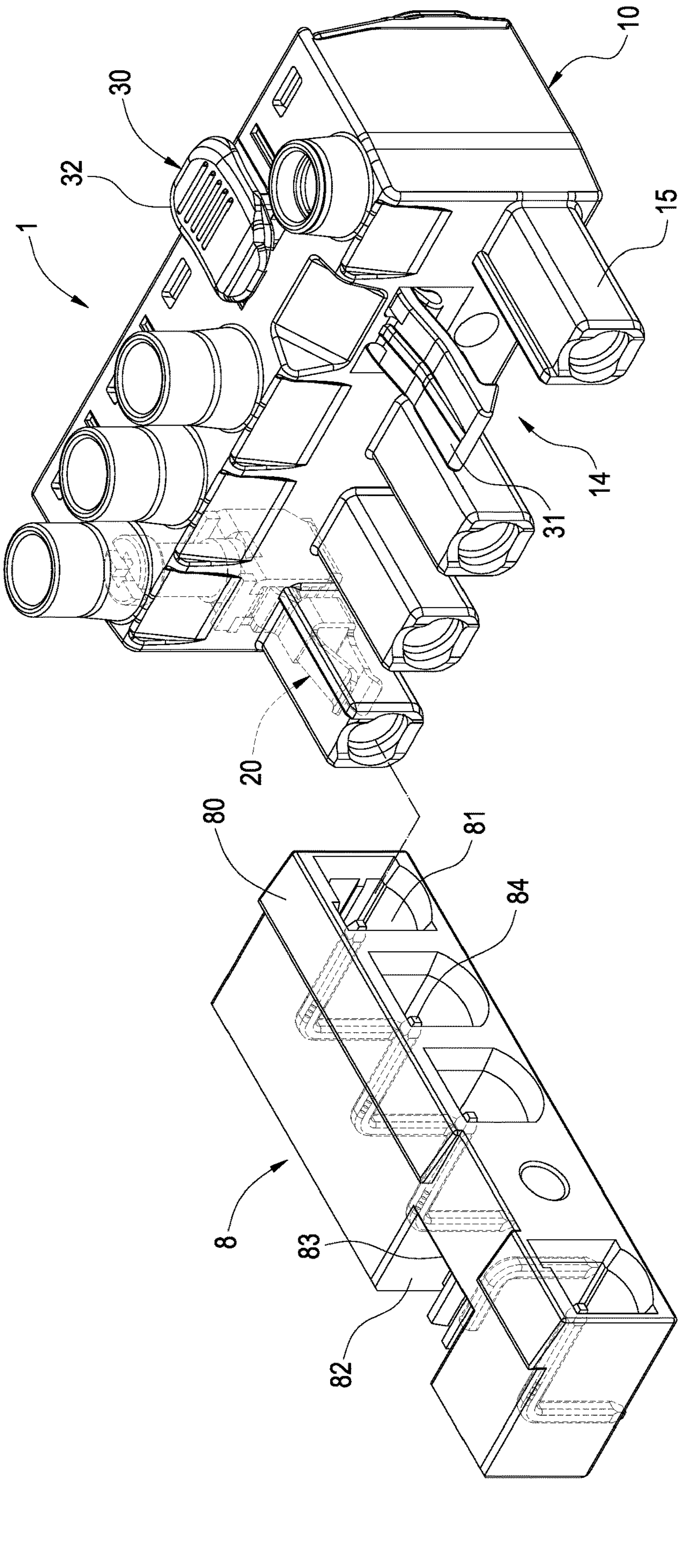
FIG. 5 is a perspective exploded view showing the plug connector and the socket connector according to the present disclosure.
Figure 6:
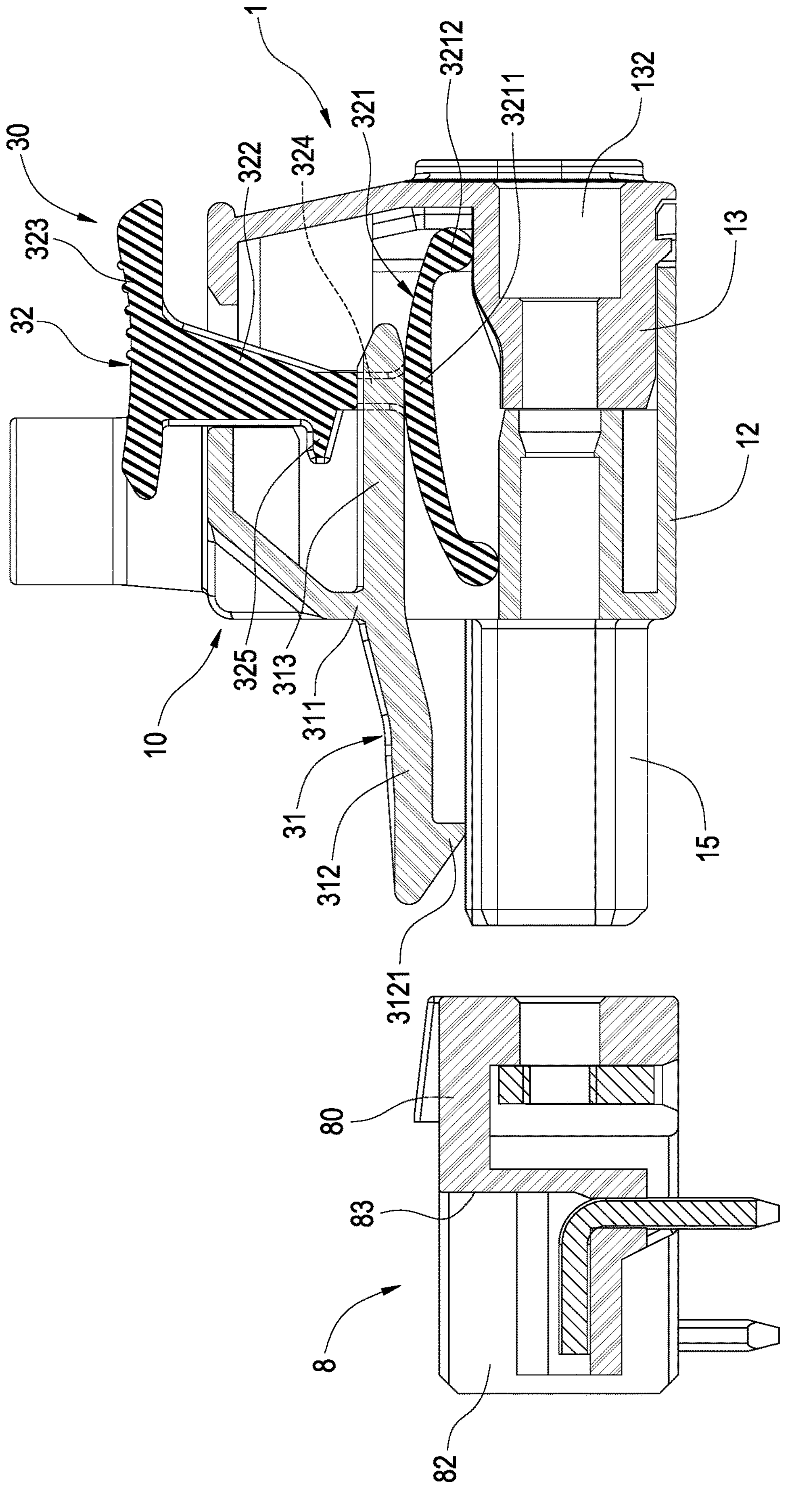
FIG. 6 is a cross sectional exploded view showing the plug connector and the socket connector according to the present disclosure.
Figure 7:
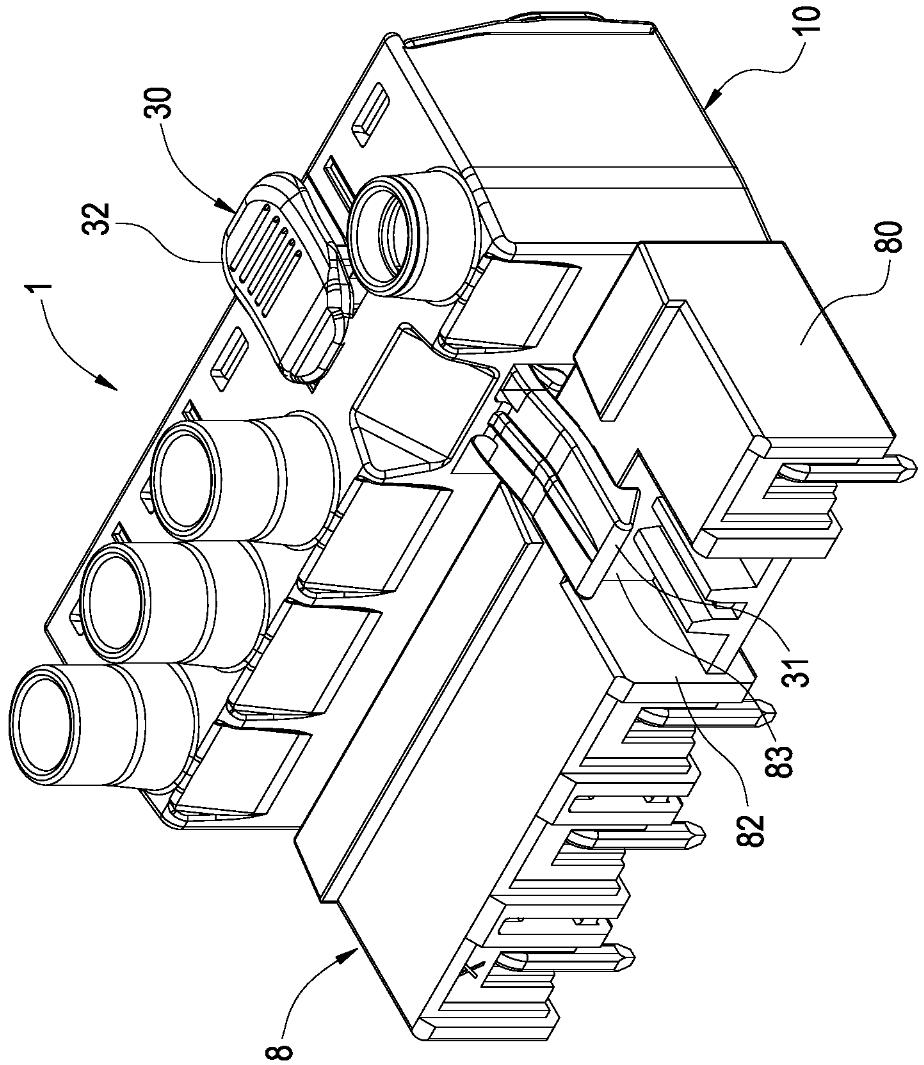
FIG. 7 is a perspective view showing the assembly of the plug connector and the socket connector according to the present disclosure.
Figure 8:
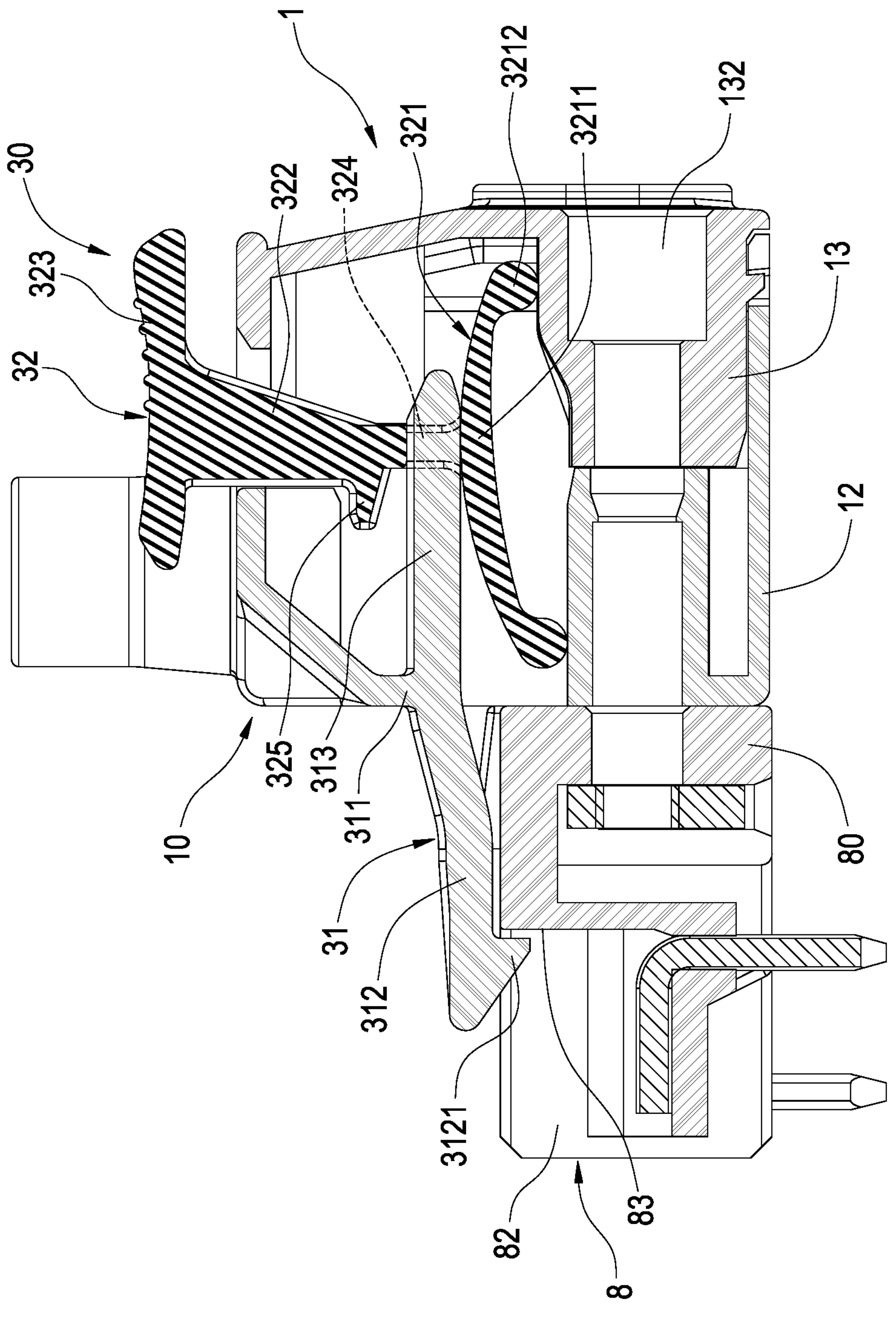
FIG. 8 is a cross sectional view showing the assembly of the plug connector and the socket connector according to the present disclosure.

Please refer from FIG. 1 to FIG. 8, the present disclosure provides a plug connector. As shown in FIG. 5 and FIG. 6, the plug connector 1 is connected to a socket connector 8. The socket connector 8 has a rectangular frame member 80 and a plurality of electric conductive pins 84. The rectangular frame member 80 is made of a material having a desirable insulating property, for example a plastic material. The rectangular frame member 80 has a plurality of guide slots 81. The guide slots 81 are spaced with intervals. A guide channel 82 is formed between two of the adjacent guide slots 81, and a locking edge 83 is formed in the guide channel 82. Each of the electric conductive pins 84 is disposed corresponding to each of the guide slots 81. A portion of each of the electric conductive pins 84 exposed from the rectangular frame member 80 is soldered and combined with a printed electric circuit board (not shown in figures), thus the socket connector 8 is fastened on the printed electric circuit board to form an adapting connector.

Please refer from FIG. 1 to FIG. 4. In some embodiments, the plug connector 1 is a plug-in connector. The plug connector 1 has an insulation housing 10, a plurality of electric conductive terminals 20 and an unlocking assembly 30.

The insulation housing 10 mainly has a main body part 11 and a plurality of hollow columnar plugging members 15. The main body part 11 has a front shell cap 12 and a rear shell cover 13. The hollow columnar plugging members 15 are spaced with intervals and extended from a distal surface of the front shell cap 12. The front shell cap 12 and each of the hollow columnar plugging members 15 are made of a material having a desirable insulating property, for example a plastic material. A buckle operating zone 14 is formed between the two adjacent hollow columnar plugging members 15 of the front shell cap 12. A penetrated hole 121 is formed on the front shell cap 12 at a location corresponding to the buckle operating zone 14, and an opened slot 122 corresponding to the buckle operating zone 14 is formed at an upper location of the front shell cap 12. Moreover, a buckle slot 123 corresponding to each of the hollow columnar plugging members 15 is formed at a top end of the front shell cap 12.

The rear shell cover 13 is correspondingly engaged with the front shell cap 12, and a wire inserting hole 131 is formed corresponding to each of the hollow columnar plugging members 15. The wire inserting hole 131 allows a conductive wire (not shown in figures) to be inserted. A through hole 132 communicating with the penetrated hole 121 is formed between every two of the wire inserting holes 131. Moreover, a buckle block 133 is formed at the top end of the rear shell cover 13 and arranged corresponding to each of the wire inserting holes 131. Each of the buckle blocks 133 is mutually buckled and fastened with each of the buckle slots 123.

Each of the electric conductive terminals 20 is accommodated in the front shell cap 12 of the insulation housing 10 and the hollow columnar plugging member 15, and is arranged corresponding to each of the hollow columnar plugging members 15. Each of the electric conductive terminals 20 mainly has a conductive wire clipping part 21 and a pin clipping part 22 connected to the conductive wire clipping part 21. The conductive wire clipping part 21 is disposed corresponding to the wire inserting hole 131, and the pin clipping part 22 is extended into hollow columnar plugging member 15.

The unlocking assembly 30 is disposed on the insulation housing 10, and mainly has a locking part 31 and an actuating part 32 separately arranged relative to the locking part 31. The locking part 31 and the front shell cap 12 of the main body part 11 are formed in a one piece (or integrally formed), and the locking part 31 is located above the buckle operating zone 14. The locking part 31 mainly has a pivotal part 311 connected to the front shell cap 12, a locking piece 312 horizontally extended from the pivotal part 311 and a force applying arm 313 horizontally extended from the pivotal part 311 towards a direction opposite to the locking piece 312. One end of the locking piece 312 away from the pivotal part 311 is formed with a latching hook 3121.

The actuating part 32 is disposed corresponding to the locking part 31. The actuating part 32 mainly has a recovering elastic sheet 321, a supporting frame 322 longitudinally extended along a central location of the recovering elastic sheet 321 and a pressing handle 323 extended from the supporting frame 322. The recovering elastic sheet 321 is disposed in the main body part 11. The supporting frame 322 passes through the opened slot 122 of the front shell cap 12. The pressing handle 323 is disposed at an outer side of the main body part 11. The recovering elastic sheet 321 mainly has an arched plate 3211 and a circular column 3212 disposed at two ends of the arched plate 3211. The arched plate 3211 is crossly arranged between the front shell cap 12 and the rear shell cover 13. Each of the circular columns 3212 respectively abuts against inside the front shell cap 12 and the rear shell cover 13. A mounting port 324 is formed at a joint location where the arched plate 3211 is connected to the supporting frame 322. The mounting port 324 allows the force applying arm 313 to be accommodated. Moreover, a stopping block 325 is disposed at a top end of the mounting port 324 of the supporting frame 322 and used for limiting (restricting) a moving stroke of the actuating part 32.

Please refer from FIG. 5 to FIG. 8, when being in use, each of the hollow columnar plugging members 15 of the plug connector 1 is aimed at each of the guide slots 81 of the socket connector 8 for being inserted and combined. Each of the electric conductive pins 84 is mounted and clipped in each of the pin clipping parts 22, thus each of the electric conductive terminals 20 is electrically connected to each of the electric conductive pins 84, and the latching hook 3121 of the locking piece 312 is in contact with a top surface of the rectangular frame member 80. The locking part 31 upwardly elevates with the pivotal part 311 as a rotating center, and slides along the top surface of the rectangular frame member 80, at this moment the arched plate 3211 is downwardly pressed via the force applying arm 313. When the latching hook 3121 reaches the locking edge 83, the latching hook 3121 is downwardly displaced through the guide channel 82 and locked at the locking edge 83 through an elastic effect of the arched plate 3211.

Figure 9:
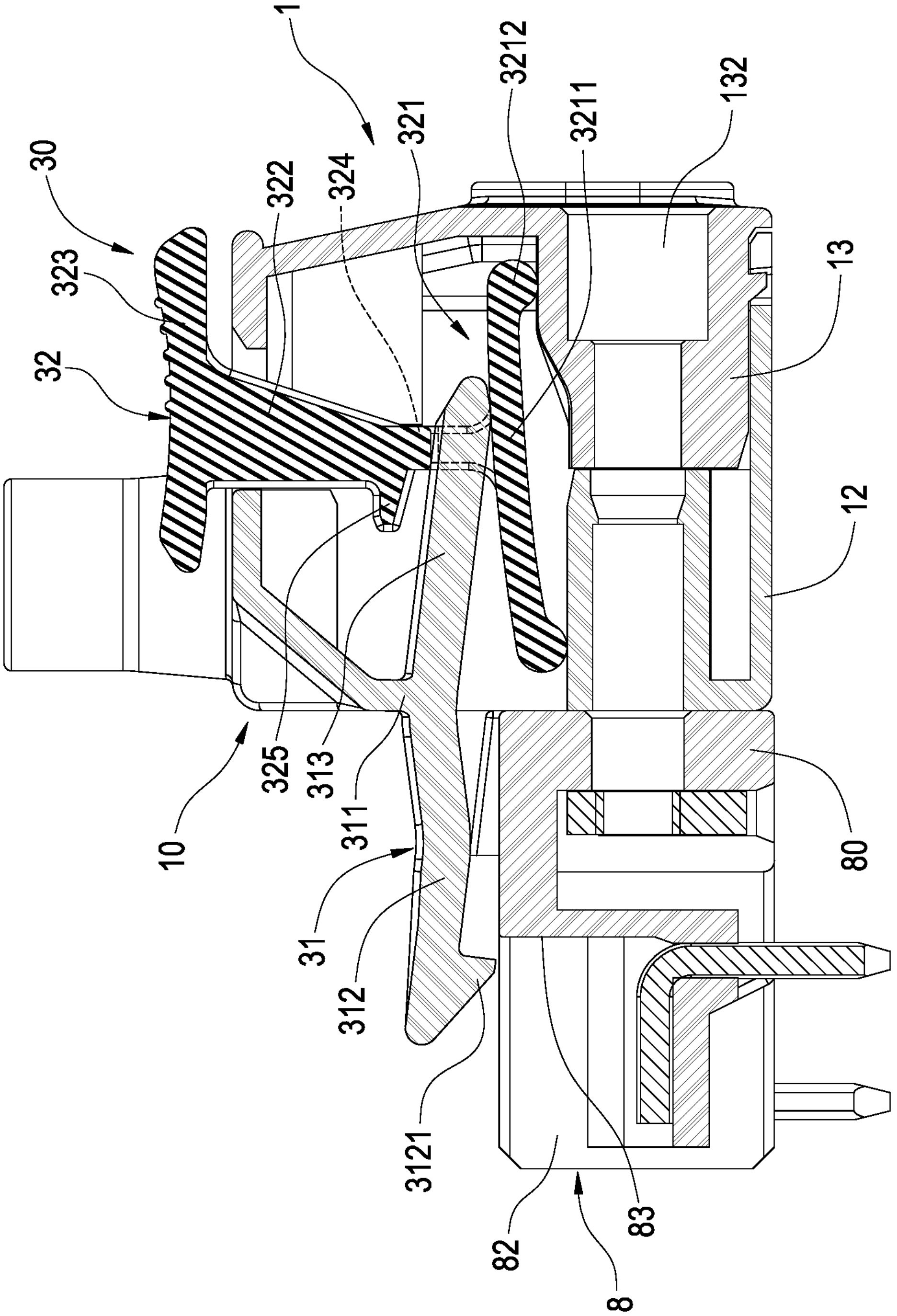
FIG. 9 is a cross sectional view showing an operating status of the plug connector and the socket connector according to the present disclosure.
Figure 10:
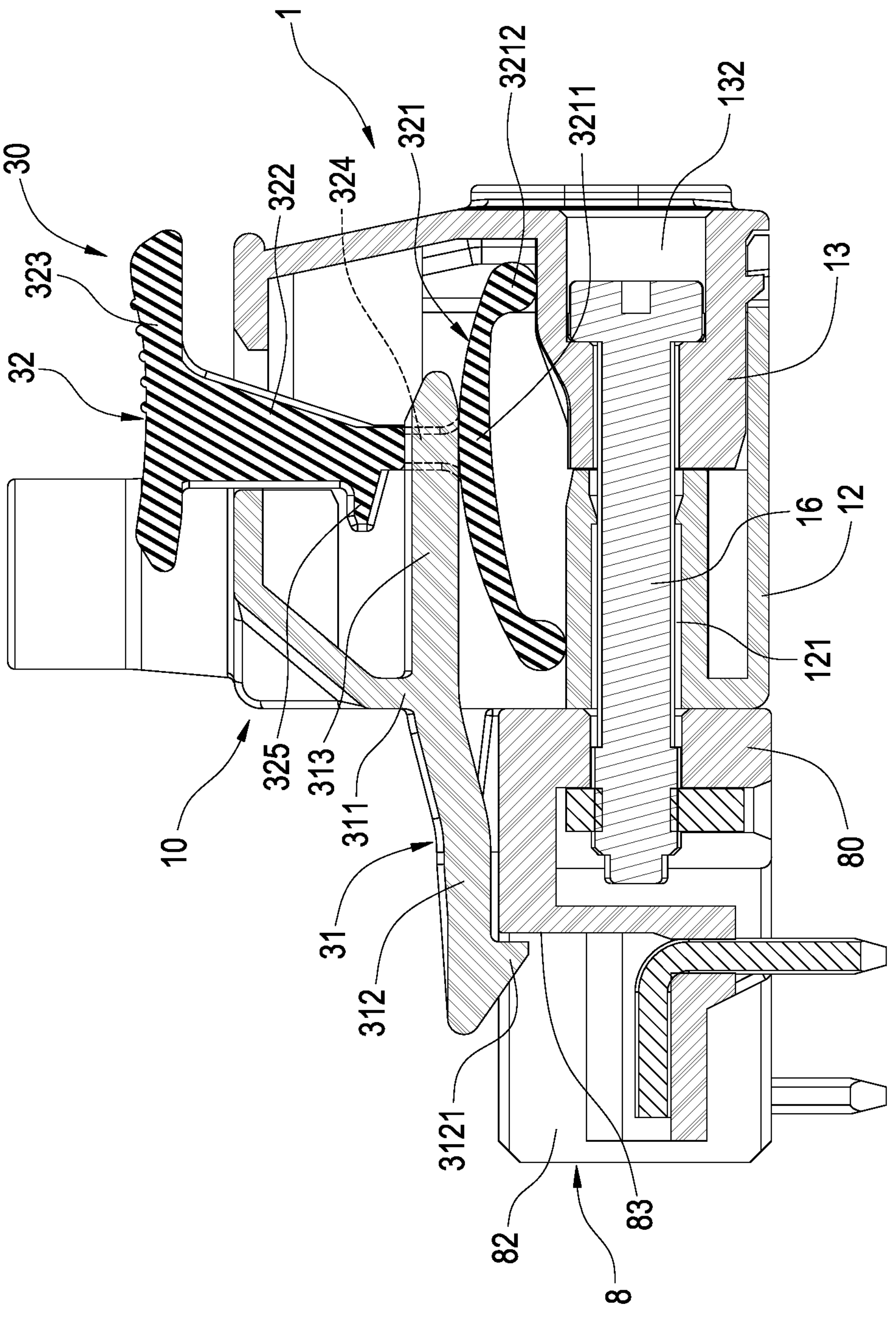
FIG. 10 is a cross sectional view showing another operating status of the plug connector and the socket connector according to the present disclosure.
Figure 11:
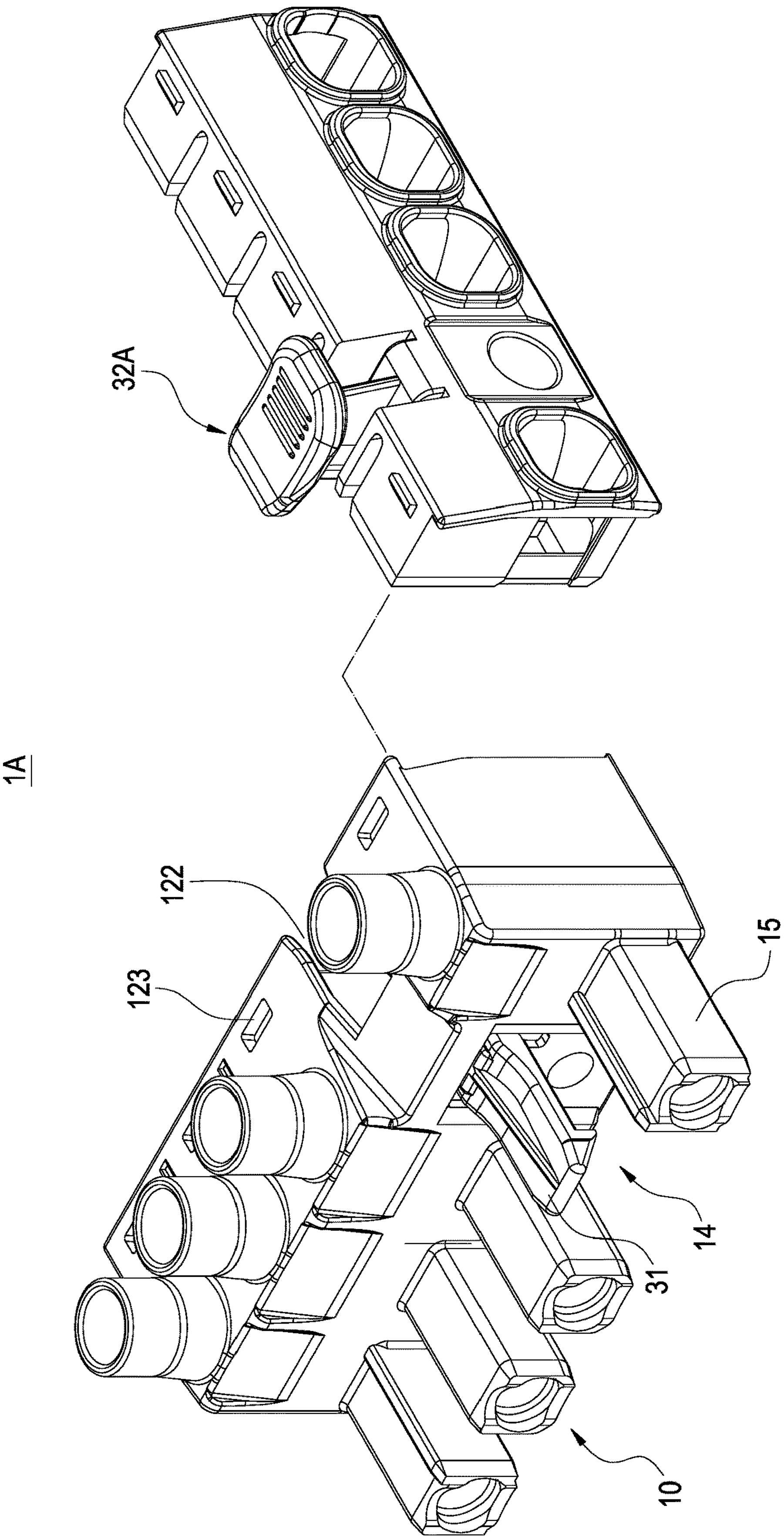
FIG. 11 is a perspective exploded view according to another embodiment of the present disclosure.
Figure 12:
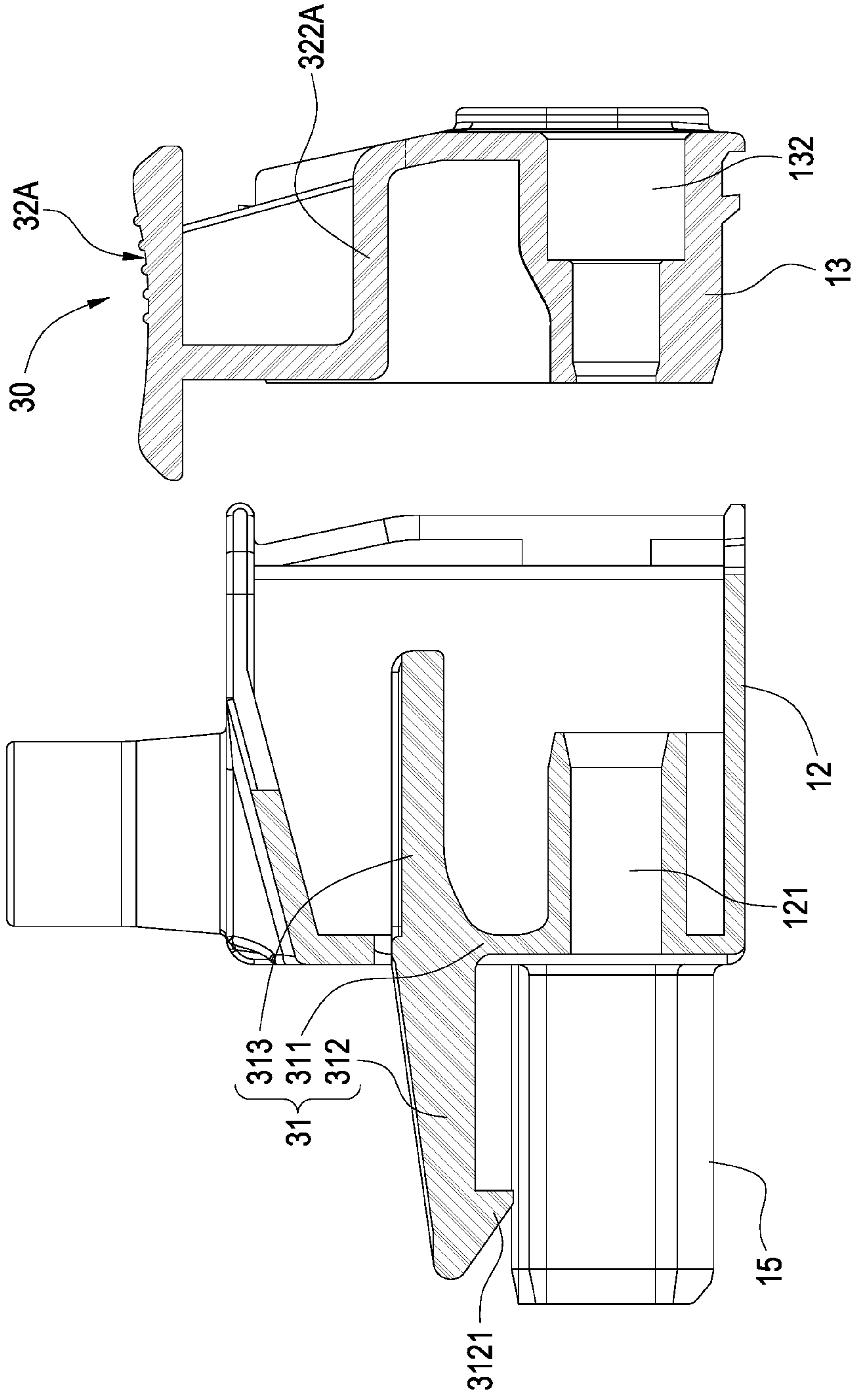
FIG. 12 is a cross sectional exploded view according to another embodiment of the present disclosure.
Figure 13:
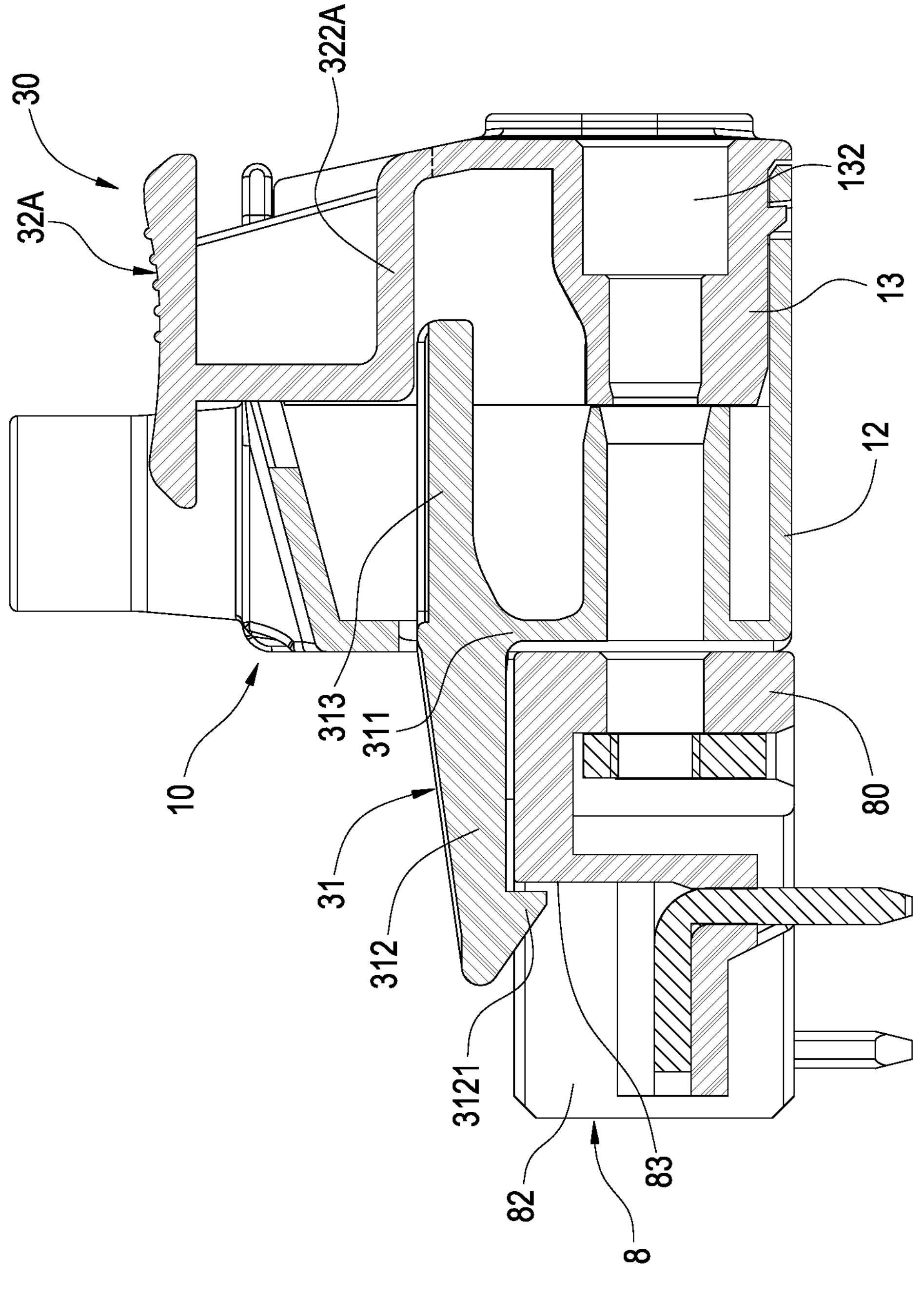
FIG. 13 is a cross sectional view showing the assembly according to another embodiment of the present disclosure.
Figure 14:
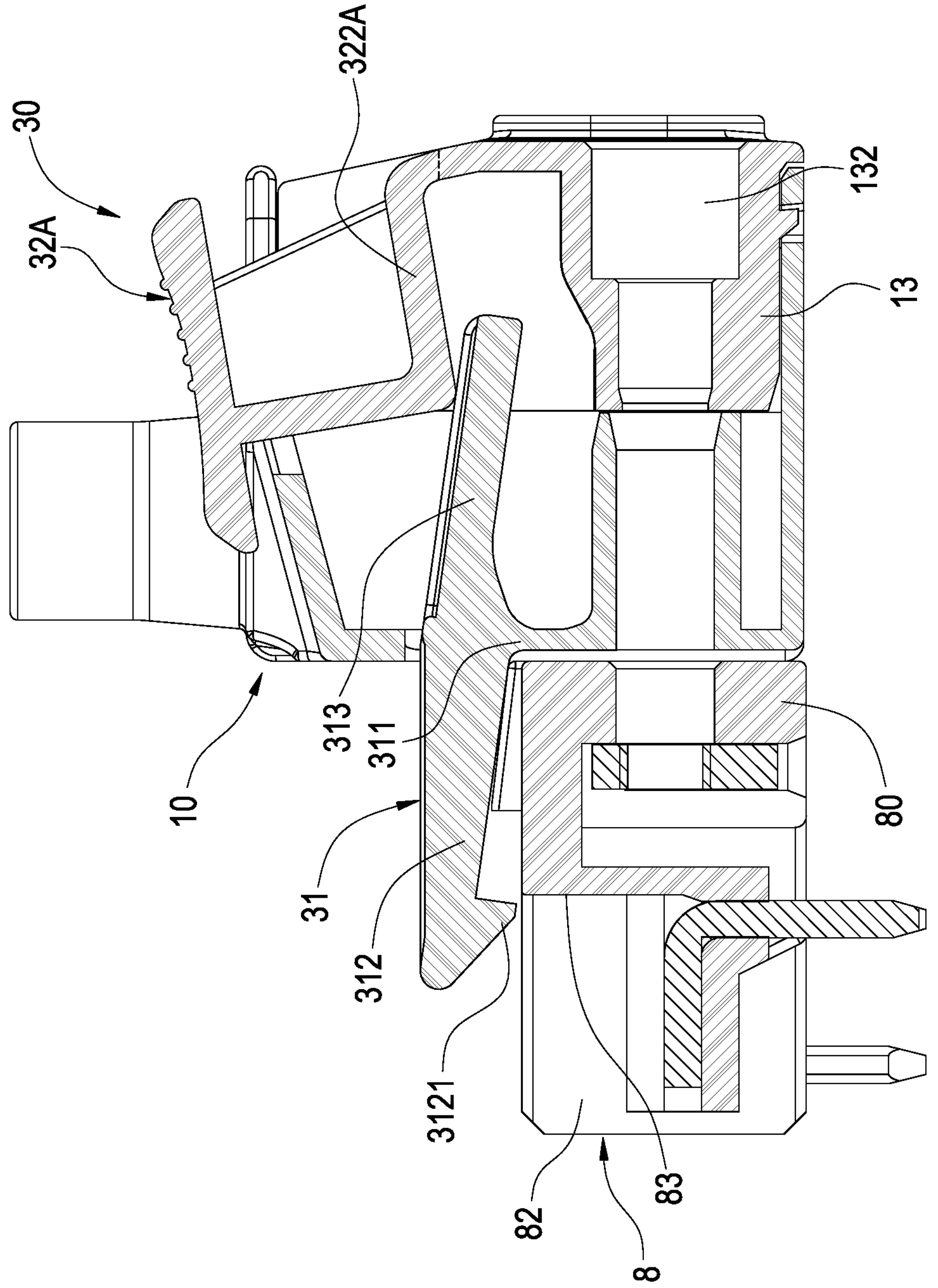
FIG. 14 is a cross sectional view showing an operating status according to another embodiment of the present disclosure.

Please refer to FIG. 9 and FIG. 10, when being unbuckled, an external force is applied to the pressing handle 323 of the actuating part 32, the supporting frame 322 of the actuating part 32 downwardly drives the force applying arm 313 of the locking part 31, at this moment the locking part 31 upwardly rotates with the pivotal part 311 as the rotating center, thus the latching hook 3121 of the locking piece 312 and the locking edge 83 of the socket connector 8 are unbuckled.

Please refer from FIG. 11 to FIG. 14, a plug connector 1A is disclosed in one of the exemplary embodiments of the present disclosure. The differences between the plug connector 1A and the plug connector 1 are as follows. An actuating part 32A and the rear shell cover 13 are formed in a one piece (or integrally formed), and a supporting frame 322A is substantially formed in an L-like status. When being operated, a corner end of the supporting frame 322A applies an external force to the force applying arm 313, at this moment the locking part 31 upwardly rotates with the pivotal part 311 as the rotating center, thus the latching hook 3121 of the locking piece 312 and the locking edge 83 of the socket connector 8 are unbuckled.

While this disclosure has been described by means of specific embodiments, numerous modifications and variations could be made thereto by those skilled in the art without departing from the scope and spirit of this disclosure set forth in the claims.

What is claimed is:

1. A plug connector (1), inserted to and combined with a socket connector (8), and comprising:

an insulation housing (10), comprising a main body part (11) and a plurality of hollow columnar plugging members (15), wherein the hollow columnar plugging members (15) are arranged spacedly and extended from the main body part (11);

a plurality of electric conductive terminals (20), disposed in the insulation housing (10) corresponding to the hollow columnar plugging members (15) respectively; and an unlocking assembly (30), disposed on the insulation housing (10) and comprising a locking part (31) and an actuating part (32) separately arranged relative to the locking part (31), wherein the actuating part (32) is disposed corresponding to the locking part (31), the locking part (31) comprises a pivotal part (311) connected to the main body part (11), a locking piece (312) extended from the pivotal part (311) and a force applying arm (313) extended from the pivotal part (311) towards a direction opposite to the locking piece (312), a latching hook (3121) is disposed on one end of locking piece (312) away from the pivotal part (311);

wherein, when an external force is applied to the actuating part (32), the actuating part (32) drives the locking part (31) to rotate to make the latching hook (3121) of the locking piece (312) and the socket connector (8) be unbuckled.

2. The plug connector (1) according to claim 1, wherein the actuating part (32) comprises a recovering elastic sheet (321), a supporting frame (322) extended from the recovering elastic sheet (321) and a pressing handle (323) extended from the supporting frame (322), the main body part (11) comprises a front shell cap (12) and a rear shell cover (13) correspondingly engaged with the front shell cap (12), the front shell cap (12) comprises an opened slot (122), the recovering elastic sheet (321) is disposed in the main body part (11), the supporting frame (322) passes through the opened slot (122), and the pressing handle (323) is disposed outside the main body part (11).

3. The plug connector (1) according to claim 2, wherein the recovering elastic sheet (321) comprises an arched plate (3211) and two circular columns (3212) respectively disposed on two ends of the arched plate (3211), the arched plate (3211) is crossly arranged between the front shell cap (12) and the rear shell cover (13), and each of the circular columns (3212) abuts against inside the front shell cap (12) and the rear shell cover (13).

4. The plug connector (1) according to claim 3, wherein a mounting port (324) is defined on a joint location between the arched plate (3211) and the supporting frame (322), and the force applying arm (313) passes through and is accommodated in the mounting port (324).

5. The plug connector (1) according to claim 4, wherein the supporting frame (322) comprises a stopping block (325) disposed on a top end of the mounting port (324) to restrict a moving stroke of the actuating part (32).

6. The plug connector (1) according to claim 1, wherein the main body part (11) comprises a front shell cap (12) and a rear shell cover (13) correspondingly engaged with the front shell cap (12), the locking part (31) and the front shall cap (12) are integrally formed, and the actuating part (32A) and the rear shell cover (13) are in a one-piece form.

7. The plug connector (1) according to claim 1, wherein the main body part (11) comprises a front shell cap (12) and a rear shell cover (13) correspondingly engaged with the front shell cap (12), each of the hollow columnar plugging members (15) is extended from a distal surface of the front shell cap (12), the rear shell cover (13) comprises a plurality of wire inserting holes (131) corresponding to the hollow columnar plugging members (15).

8. The plug connector (1) according to claim 7, wherein each of the electric conductive terminals (20) comprises a conductive wire clipping part (21) and a pin clipping part (22) connected to the conductive wire clipping part (21), the conductive wire clipping part (21) is disposed corresponding to one of the wire inserting holes (131), and the pin clipping part (22) is extended into one of the hollow columnar plugging members (15).

9. The plug connector (1) according to claim 7, wherein a buckle operating zone (14) is defined between two hollow columnar plugging members (15) of the front shell cap (12) adjacent to each other, and the locking piece (312) is disposed in the buckle operating zone (14).

10. The plug connector (1) according to claim 7, wherein the front shell cap (12) comprises a plurality of buckle slots (123) corresponding to the hollow columnar plugging members (15), and the rear shell cover (13) comprises a plurality of buckle blocks (133) corresponding to the buckle slots (123) and buckled with the buckled slots (123).

* * * * *